United States Patent
Lee et al.

(10) Patent No.: US 12,366,273 B2
(45) Date of Patent: Jul. 22, 2025

(54) COMPOSITE BRAKE DRUM

(71) Applicant: GM GLOBAL TECHNOLOGY OPERATIONS LLC, Detroit, MI (US)

(72) Inventors: Heewook Lee, Oakland Township, MI (US); Zhongyi Liu, Troy, MI (US); Anil K. Sachdev, Rochester Hills, MI (US); Tyson Whittier Brown, Royal Oak, MI (US); Ratandeep Singh Kukreja, Auburn Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 435 days.

(21) Appl. No.: 18/087,217

(22) Filed: Dec. 22, 2022

(65) Prior Publication Data

US 2024/0209908 A1      Jun. 27, 2024

(51) Int. Cl.
*F16D 65/10* (2006.01)
*F16D 65/02* (2006.01)

(52) U.S. Cl.
CPC ........ *F16D 65/10* (2013.01); *F16D 2065/132* (2013.01); *F16D 2200/0017* (2013.01); *F16D 2200/003* (2013.01); *F16D 2200/0039* (2013.01); *F16D 2250/0046* (2013.01)

(58) Field of Classification Search
CPC ....... F16D 2200/003; F16D 2200/0039; F16D 2200/0017; F16D 2250/0046; F16D 65/10; F16D 2065/132
See application file for complete search history.

(56) References Cited

U.S. PATENT DOCUMENTS

| | | | | |
|---|---|---|---|---|
| 5,629,101 | A | * 5/1997 | Watremez | F16D 65/125 188/251 A |
| 2020/0309222 | A1 | * 10/2020 | Müller | F16D 69/027 |
| 2021/0017629 | A1 | * 1/2021 | Liu | C22F 1/04 |
| 2024/0019007 | A1 | * 1/2024 | Lee | C22C 38/06 |
| 2024/0218909 | A1 | * 7/2024 | Liu | F16D 65/10 |
| 2024/0344575 | A1 | * 10/2024 | Liu | C22C 38/02 |

OTHER PUBLICATIONS

U.S. Appl. No. 17/863,142, filed Jul. 12, 2022, Lee et al.

* cited by examiner

*Primary Examiner* — David R Morris (57) ABSTRACT

A brake drum having a composite structure includes a cylindrical body defining an inner friction surface and an outer surface. The cylindrical body includes a drum core comprising an Al—Si alloy, the drum core including an inner surface, and an outer surface of the drum core defining the outer surface of cylindrical body. The cylindrical body includes a thermal barrier layer comprising a thermally insulating material on the inner surface of the drum core, and a wear-resistant layer comprising an Fe—Al—Si—Zr alloy on the inner surface of the drum core over the thermal barrier layer, the wear-resistant layer defining the inner friction surface of the cylindrical body.

20 Claims, 4 Drawing Sheets

COMPOSITE BRAKE DRUM

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure generally relates to brake drums and, more particularly, to composite brake drums made of lightweight aluminum alloys.

Drum brake assemblies of automotive vehicles include use friction caused by a set of shoes or linings that press outward against a rotating cylinder-shaped part called a brake drum. The rotating drum may be connected with a rotatable axle of the vehicle, which may be coupled to a wheel of the vehicle. During braking, the set of shoes or linings press on, for example, an inner surface of the drum, which may have a friction surface. The shoes or linings engage the friction surfaces of the drum and slow or stop rotation of the drum and the wheel. Brake drums of automotive vehicles are often made of cast iron, which can withstand the high friction forces and high temperatures generated during braking.

SUMMARY

A brake drum having a composite structure includes a cylindrical body defining an inner friction surface and an outer surface. The cylindrical body includes a drum core comprising an Al—Si alloy, the drum core including an inner surface, and an outer surface of the drum core defining the outer surface of cylindrical body. The cylindrical body includes a thermal barrier layer comprising a thermally insulating material on the inner surface of the drum core, and a wear-resistant layer comprising an Fe—Al—Si—Zr alloy on the inner surface of the drum core over the thermal barrier layer, the wear-resistant layer defining the inner friction surface of the cylindrical body.

In other features, the wear-resistant layer is configured to engage one or more brake linings or brake shoes of a vehicle to slow rotation of the cylindrical body during braking of the vehicle. In other features, the cylindrical body is configured to couple with an axle of the vehicle to slow rotation of one or more wheels connected to the axle in response to the one or more brake linings or brake shoes engaging the wear-resistant layer.

In other features, the Fe—Al—Si—Zr alloy comprises, by mass, greater than or equal to 45% to less than or equal to 60% iron, greater than or equal to 35% to less than or equal to 45% aluminum, greater than or equal to 1% to less than or equal to 3% zirconium, and greater than or equal to 0.5% to less than or equal to 2% silicon.

In other features, the Fe—Al—Si—Zr alloy comprises, by mass, comprises a grain refiner in an amount, by mass, greater than or equal to 0.05% to less than or equal to 1% of the Fe—Al—Si—Zr alloy, and the grain refiner comprises at least one of chromium(III) boride and tantalum boride.

In other features, the Fe—Al—Si—Zr alloy has a density of greater than or equal to 4,800 kilograms per cubic meter to less than or equal to 5,200 kilograms per cubic meter, the Fe—Al—Si—Zr alloy has a specific heat capacity of greater than or equal to 0.61 kilojoules per kilogram-kelvin to less than or equal to 0.67 kilojoules per kilogram-kelvin, and the Fe—Al—Si—Zr alloy has a thermal conductivity of greater than or equal to about 11 watts per meter-kelvin to less than or equal to 13 watts per meter-kelvin.

In other features, the thermally insulating material comprises a high entropy alloy, a high entropy ceramic, or a combination thereof. In other features, the thermally insulating material has a thermal conductivity of greater than or equal to 0.4 watts per meter-kelvin to less than or equal to 0.7 watts per meter-kelvin, the thermally insulating material has a specific heat capacity of greater than or equal to 1.3 kilojoules per kilogram-kelvin to less than or equal to 1.7 kilojoules per kilogram-kelvin, and the thermally insulating material has a density of greater than or equal to 1,300 kilograms per cubic meter to less than or equal to 1,700 kilograms per cubic meter.

In other features, the thermal barrier layer is perforated and includes a plurality of through-holes extending from the inner surface of the drum core to the wear-resistant layer. In other features, the Fe—Al—Si—Zr alloy of the wear-resistant layer is metallurgically bonded to the Al—Si alloy of the drum core via the plurality of through-holes of the thermal barrier layer.

In other features, the Al—Si alloy comprises, by mass, greater than or equal to 7% to less than or equal to 20% silicon, greater than or equal to 0.4% to less than or equal to 0.9% magnesium, and greater than or equal to 79.1% to less than or equal to 92.6% aluminum.

In other features, the Al—Si alloy comprises 359.0 cast aluminum. In other features, the Al—Si alloy has a density of greater than or equal to 2,500 kilograms per cubic meter to less than or equal to 2,900 kilograms per cubic meter, the Al—Si alloy has a specific heat capacity of greater than or equal to 0.9 kilojoules per kilogram-kelvin to less than or equal to 1.3 kilojoules per kilogram-kelvin, and the Al—Si alloy has a thermal conductivity of greater than or equal to about 186 watts per meter-kelvin to less than or equal to 225 watts per meter-kelvin.

A method of manufacturing a brake drum includes casting an Al—Si alloy into a shape of a brake drum core, the brake drum core defining a cylindrical body including an inner surface and an outer surface, depositing a thermally insulating material directly on the inner surface of the brake drum core to form a thermal barrier layer, and depositing an Fe—Al—Si—Zr alloy on the inner surface of the brake drum core over the thermal barrier layer to form a wear-resistant layer, the wear-resistant layer including an inner friction surface configured to engage one or more brake linings or shoes of a vehicle to slow rotation of the brake drum during braking of the vehicle.

In other features, the thermally insulating material and the Fe—Al—Si—Zr alloy are deposited on the inner surface of the brake drum core using a directed energy deposition process. In other features, the thermally insulating material is deposited on the inner surface of the brake drum core such that the thermal barrier layer is perforated and includes a plurality of through-holes extending from the inner surface of the brake drum core to the wear-resistant layer.

In other features, during deposition of the Fe—Al—Si—Zr alloy on the inner surface of the brake drum core, the Fe—Al—Si—Zr alloy flows into and through the through-holes in the thermal barrier layer to metallurgically bond the Fe—Al—Si—Zr alloy of the wear-resistant layer to the Al—Si alloy of the brake drum core.

A brake drum having a composite structure includes a cylindrical body defining an inner friction surface and an outer surface. The cylindrical body includes a drum core comprising an aluminum (Al) alloy, the drum core including an inner surface, and an outer surface of the drum core defining the outer surface of cylindrical body. The cylindrical body includes a thermal barrier layer comprising a thermally insulating material on the inner surface of the drum core, and a wear-resistant layer comprising an Iron-Aluminum-Silicon-Zirconium (Fe—Al—Si—Zr) alloy on the inner surface of the drum core over the thermal barrier layer, the wear-resistant layer defining the inner friction surface of the cylindrical body.

In other features, the thermally insulating material comprises a high entropy alloy, a high entropy ceramic, or a combination thereof. In other features, the thermal barrier layer is perforated and includes a plurality of through-holes extending from the inner surface of the drum core to the wear-resistant layer.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

In some example embodiments described herein, a composite brake drum for vehicles includes both an aluminum-silicon (Al—Si) alloy and an aluminum-iron-silicon-zirconium (AlFeSiZr) alloy, with a thermal barrier between two layers. Aluminum alloys such as Al—Si may be, for example, ⅓ of the weight of cast iron. However, aluminum alloys such as Al—Si may be limited in use as a whole brake drum, due to Al—Si having a lower temperature limit than, e.g., cast iron. For example, an Al—Si alloy may have a safe temperature limit of less than 350° C.

Some aluminum alloys have better heat resistance than Al—Si, such as an AlFeSiZr alloy. However, due to its brittleness, an AlFeSiZr alloy may not perform as desired for a drum core material. An AlFeSiZr alloy may be better suited as a cladding material that provides better wear resistance and corrosion resistance (e.g., compared to cast iron). For example, structural integrity of an AlFeSiZr alloy may remain intact up to, e.g., 1,300° C. An AlFeSiZr alloy may be very suitable for the friction surface of the drum brake, where a friction surface rubs against brake linings or brake shoes to stop a vehicle during braking.

In view of the above, a high-temperature-tolerant, lightweight brake drum may include an aluminum alloy like AlFeSiZr alloy on the friction surface, and a lightweight material like Al—Si alloy as a core material. However, due to high conductivity of Al—Si compared to cast iron (e.g., 200 W/mK vs. 50 W/mK) and lower thermal mass of Al—Si compared to cast iron (e.g., 2,700 kg/m3 vs 7,500 kg/m3), a brake drum core temperature may reach higher than the temperature of cast iron as shown below (for example, due to heat conduction from the friction surface of the AlFeSiZr alloy to the core material Al—Si alloy).

In various implementations, example drum brake assemblies may include a thermal barrier (such as a high entropy alloy (HEA)) between a lightweight Al—Si alloy in the drum core, and a wear-resistant, high-heat-tolerant, and corrosion-resistant AlFeSiZr alloy on the surface, in order to retain advantages of both materials without sacrificing performance. For example, with a thermal barrier like a HEA, it may be possible to maintain the drum core temperature at a lower level, compared to an implementation without a thermal barrier layer. In various implementations, the thicknesses of each layer may be adjusted as desired, to optimize the thermal performance, material wear, structural strength, etc.

In some example embodiments, a composite brake drum may include Al—Si as a drum core material. Al—Si is ductile and easily cast-able for complex shapes such as cylindrical brake drums.

A thermal barrier including one or more high entropy alloys may be laid over a surface of the drum core material (such as the inner surface of a cylindrical drum core). In various implementations, no bonding material is applied between the drum core and the thermal barrier layer. This thermal barrier layer may include small perforations, so that the friction layer material flows into the drum core material through the perforations, allowing the friction layer material to bond or fuse with the drum material.

The friction layer of composite brake drum, which may contact or engage friction material of brake linings or brake shoes, may be made out of a heat, wear and corrosion resistant Al alloy such as AlFeSiZr. This friction layer may provide superior heat, wear and corrosion resistance compared to, for example, cast iron.

In various implementations, a composite brake drum may be manufactures by converting the surface of a cast Al—Si brake drum using directed energy deposition (DED) of, for example, Fe-based wire or powders, in order to create a wear-resistant AlFeSiZr intermetallic layered surface suitable for brake friction surfaces. The AlFeSiZr intermetallic layered surface may be bonded to the Al-alloy drum core, through perforations on the thermal barrier layer. A strong bond may be created due to the alloying elements Al and Si coming directly from the substrate during the DED process.

In some example embodiments, applying separate wear-resistant and heat-resistance coatings, with a thermal barrier layer, may allow for production of a composite brake drum that beats performance of, e.g., cast iron, while providing a lighter weight and superior wear resistance and corrosion resistance compared to a cast iron brake drum. Example composite brake drums including lightweight aluminum alloys for wear-resistant and heat-resistant layers, may be cost-effective since all three materials may be very affordable even compared to a cast iron brake drum. In various implementations, each layer of the composite brake drum may be added on top of substrate in a cylindrical shape, by boding or fusing each layer together and maintaining the integrity of the composite brake drum.

It may be desirable to manufacture brake drums of automotive vehicles from relatively lightweight aluminum, instead of cast iron, to decrease the weight of the vehicles. It may be desirable to develop an aluminum alloy drum brake for an automotive vehicle that exhibits wear-resistance and thermal stability at least as high as that of cast iron.

In some example embodiments, a brake drum exhibits a composite structure that allows the brake drum to be relatively light weight (e.g., as compared to brake drums primarily made of cast iron), while also exhibiting exceptional wear resistance and thermal stability. The brake drum may have a cylindrical body with at least one friction surface (e.g., on an inner surface of the cylindrical body).

The cylindrical body may include a drum core made of a relatively light weight Al—Si alloy, and a wear-resistant layer on the inner friction surface of the cylindrical body. The wear-resistant layer is made of an Fe—Al—Si—Zr alloy that is relatively hard and dense, as compared to the Al—Si alloy of the drum core.

A thermal barrier layer is sandwiched between the wear-resistant layer and the Al—Si alloy of the drum core. The thermal barrier layer may thermally insulate the Al—Si alloy of the drum core from the relatively high temperatures generated in the wear-resistant layer during braking. For example, the thermal barrier layer disposed on an inner surface of the Al—Si alloy of the drum core may help maintain the drum core at a temperature of less than about 350 degrees Celsius (° C.), even in situations where the temperature of the wear-resistant layer is greater than about 550° C.

Figure 1:
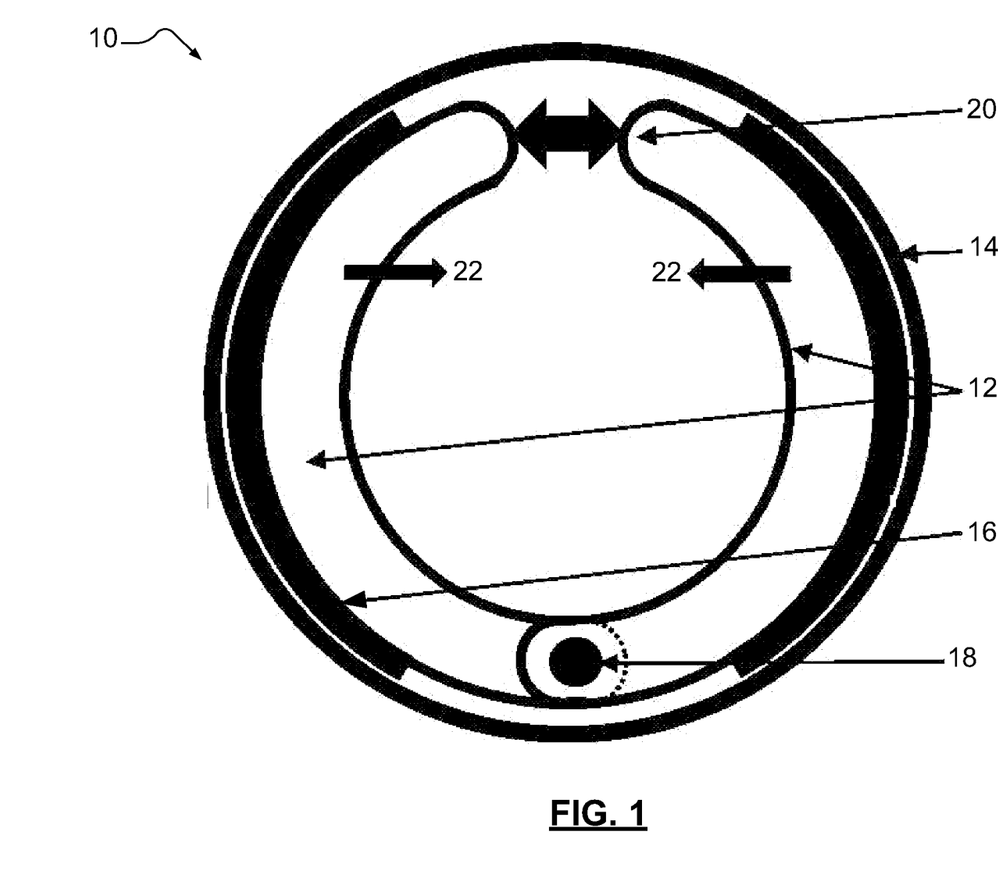
FIG. 1 is a front view of a drum brake assembly of a motor vehicle, including a composite brake drum.

FIG. 1 depicts a brake drum assembly 10 for a motor vehicle (not shown). The brake drum assembly 10 includes a cylindrical body 14. The cylindrical body 14 may be configured to mount, couple, connect, etc., to a rotatable axle of the motor vehicle (such as via a hub, etc.). For example, the cylindrical body 14 may be configured to engage with friction surfaces of brake linings 12 (or brake shoes, etc.), in order to generate frictional forces that oppose rotation of the cylindrical body 14 during braking.

Each brake lining 12 may include, for example, two pieces of steel welded together. Friction material 16 may be riveted to a lining table, attached with adhesive, etc. The brake lining 12 may have a crescent-shaped piece, which contains holes and slots in different shapes for return springs 22, hold-down hardware, parking brake linkage, self-adjusting components, etc.

Application force of the wheel cylinder may be applied through the crescent-shaped piece (e.g., web) to the lining table and brake lining. The edge of the lining table may have three "V"-shaped notches or tabs on each side (sometimes referred to as nibs). The nibs rest against the support linings of the backing plate to which the brake linings 12 are installed.

The drum brake assembly has two brake linings 12, which may include a primary and a secondary. The primary brake lining 12 may be located toward the front of the vehicle and have the lining positioned differently from the secondary brake lining 12. The brake linings 12 may move opposite one another at a pivot 18.

A wheel cylinder 20 may operate the brake on each wheel. For example, two pistons may operate the brake linings 12, with one at each end of the wheel cylinder 20. The leading brake lining 12 (closest to the front of the vehicle) may be referred to as the primary shoe. The trailing brake lining 12 may be referred to as the secondary shoe. Hydraulic pressure from the wheel cylinder 20 may act on a piston cup, pushing the pistons toward the brake linings 12, forcing them against the cylindrical body 14 of the drum. When the driver releases the brakes, the brake shoe return springs 22 restore the brake linings 12 to their original (disengaged) position.

The example brake drum assembly 10 may exhibit other configurations, as will be appreciated by persons of ordinary skill in the art. For example, in some aspects, the cylindrical body 14 may include an outer friction surface configured to engage a brake lining or brake shoe positioned outside of the cylindrical body 14, the cylindrical body 14 may be coupled to a rotatable axle of a motor vehicle by other means, etc.

Figure 2:
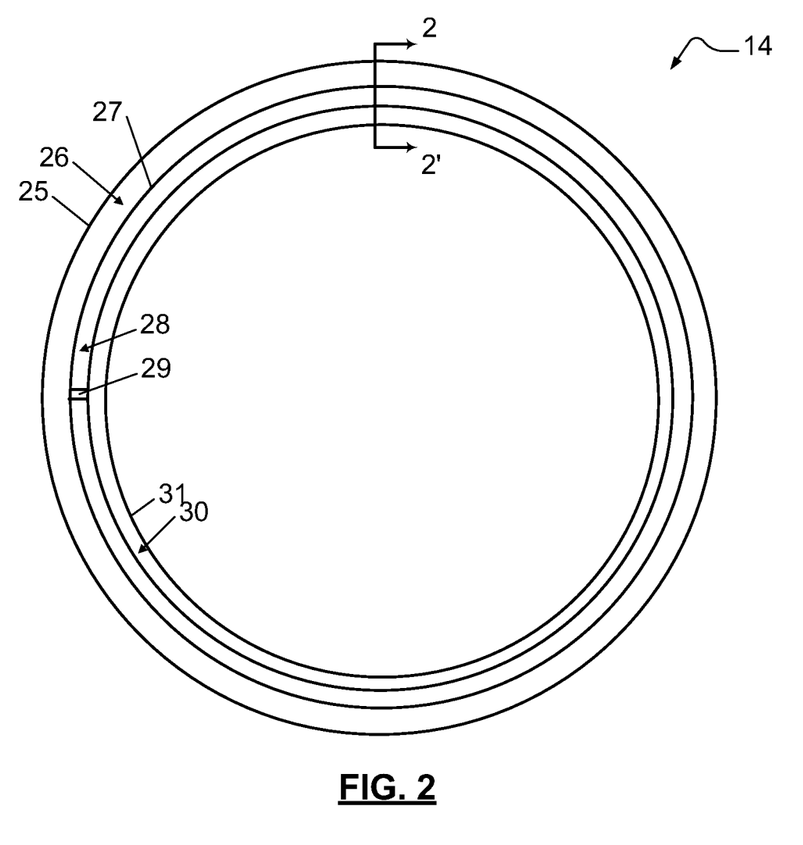
FIG. 2 is a front view of the composite brake drum of FIG. 1, illustrating layers of the composite brake drum.
Figure 3:
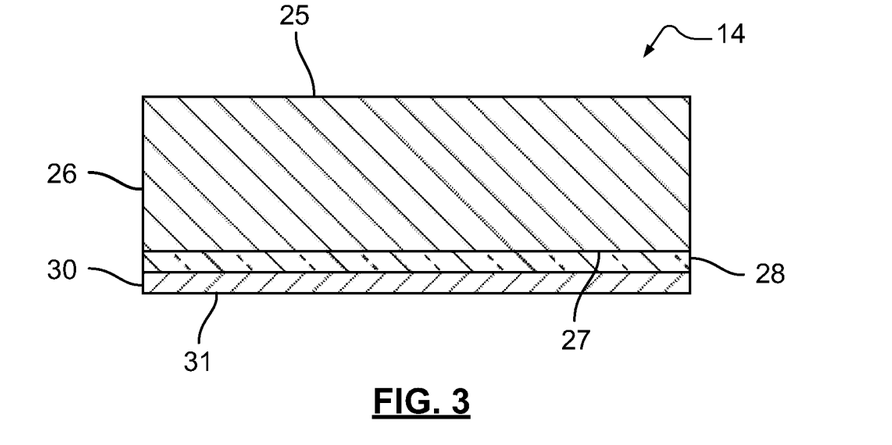
FIG. 3 is cross-sectional view of the composite brake drum of FIG. 2, taken along line 2-2 of FIG. 2.

Referring now to FIGS. 2 and 3, the cylindrical body 14 exhibits a composite structure comprising a drum core 26, a thermal barrier layer 28, and a wear-resistant layer 30. The drum core 26 includes at least one cylindrical substrate that defines an outer surface 25 and an inner surface 27. The drum core 26 may have any suitable thickness, measured between the outer surface 25 and the inner surface 27, such as greater than or equal to about 9 millimeters to less than or equal to about 36 millimeters. The drum core 26 may be of unitary one-piece construction.

The drum core 26 may include a hypereutectic aluminum alloy comprising, in addition to aluminum, at least one alloying element including silicon (Si), and thus may be referred to as an Al—Si alloy. The amount of silicon in the Al—Si alloy is selected to provide the Al—Si alloy with good castability, fluidity, and wear-resistance. The Al—Si alloy may comprise, by mass, greater than or equal to about 80% to less than or equal to about 87% aluminum and greater than or equal to about 13% to less than or equal to about 20% silicon.

In some example embodiments, the aluminum alloy may comprise, by mass, about 88.9% to about 91% aluminum, and about 8.5% to about 9.5% silicon. The aluminum alloy may be a 359.0 aluminum allow using the Aluminum Association (AA) designation, or A03590 using a UNS number. In various implementations, the aluminum alloy may comprise, by mass, about 7% to about 20% silicon, about 0.4% to about 0.9% magnesium, and about 79.1% to about 92.6% aluminum.

In some aspects, the Al—Si alloy may comprise carbon (C) as an alloying element. For example, the Al—Si alloy may comprise, by mass, greater than or equal to about 4% to less than or equal to about 8% carbon. The carbon may be present in the Al—Si alloy in the form of silicon carbide (SiC). For example, the Al—Si alloy may comprise, by mass, greater than or equal to about 10% to less than or equal to about 20% silicon carbide.

As compared to cast iron, the Al—Si alloy may exhibit excellent corrosion resistance, high ductility, and low density. For example, the Al—Si alloy may have a density of greater than or equal to about 2,600 kilograms per cubic meter (kg/m$^3$) to less than or equal to about 2,800 kg/m$^3$. For example, the Al—Si alloy may have a density of about 2,700 kg/m$^3$.

The Al—Si alloy may exhibit a thermal conductivity of greater than or equal to about 186 watts per meter-kelvin (W/m·K) to less than or equal to about 225 W/m·K, and a specific heat of greater than or equal to about 0.9 KJ/kg·K to less than or equal to about 1.3 KJ/kg·K.

The thermal barrier layer 28 is disposed on the inner surface 27 of the drum core 26, and is configured to inhibit heat transfer from the friction surface of the cylindrical body 14 to the drum core 26 during braking. In some aspects, the thermal barrier layer 28 may be deposited directly on the inner surface 27 of the drum core 26.

The thermal barrier layer 28 may help maintain the drum core 26 at a temperature of less than about 350° C., even in situations where the temperature of the wear-resistant layer 30 is greater than about 550° C. The thermal barrier layer 28 may have any suitable thickness, measured from the inner surface 27 of the drum core 26, such as greater than or equal to about 0.1 millimeters to less than or equal to about 4 millimeters. An example thickness may include less than or equal to about 2 millimeters. The thermal barrier layer 28 may be substantially coextensive with the inner surface 27 of the drum core 26.

The thermal barrier layer 28 may be made of a thermally insulating material having a relatively low thermal conductivity, as compared to the thermal conductivity of the drum core 26 and the wear-resistant layer 30. For example, the thermal conductivity of the thermally insulating material may be about 5-20% of that of the wear-resistant layer 30. The thermal conductivity of the thermally insulating material may be greater than or equal to about 0.4 W/m·K to less than or equal to about 0.7 W/m·K, in a range of about 0.5 W/m·K to less than or equal to 2 W/m·K, etc.

The thermally insulating material may have a density in a range of about 1,300 kg/m³ to about 1,500 kg/m³, such as about 1,460 kg/m³. The thermally insulating material may have a specific heat in a range of about 135 KJ/kg·K to about 1.7 KJ/kg·K, such as about 1.5 KJ/kg·K.

The thermally insulating material of the thermal barrier layer 28 may comprise a high entropy alloy, a high entropy ceramic, a combination thereof, etc. A high entropy alloy or ceramic material is an inorganic alloy or ceramic material that may comprise at least four elements, with each element being present in the alloy or ceramic at a concentration, on an atomic basis, of greater than or equal to about 5% to less than or equal to about 35%. The inorganic alloy or ceramic material may exist in the form of a solid solution with no intermetallic phases.

Examples of high entropy alloys include bismuth and tellurium (Bi—Te)-based materials and bismuth, antimony, tellurium, and selenium (Bi—Sb-Te—Se)-based materials, e.g., $BiSbTe_{1.5}Se_{1.5}$ and/or $(BiSbTe_{1.5}Se_{1.5})_{1-x}Ag_x$, where x is about 0.9 atomic percent.

Examples of high entropy ceramics include zirconate $(Zr_xO_y^{-z})$-based materials and rare earth metal zirconate $(Re_2Zr_2O_7)$-based materials, where Re is $La_2O_3$, $Nd_2O_3$, $Sm_2O_3$, $Eu_2O_3$, $Gd_2O_3$, and/or $Y_2O_3$. In some example embodiments, $Re_2O_3$ includes five constituents with equal atomic percentage: (20% $La_2O_3$, 20% $2Nd_2O_3$, 20% $2Sm_2O_3$, 20% $Gd_2O_3$, and 20% $Y_2O_3$)-$2ZrO_2$.

The wear-resistant layer 30 is disposed on the thermal barrier layer 28 and defines the inner friction surface of the cylindrical body 14 of the brake drum assembly 10. In some aspects, the wear-resistant layer 30 may be directly deposited on the thermal barrier layer 28.

The wear-resistant layer 30 is configured to provide the inner friction surface of the cylindrical body 14 with high wear-resistance and excellent thermal stability. For example, the wear-resistant layer 30 may be formulated to exhibit exceptional mechanical stability at high temperatures, e.g., at temperatures of up to about 1,300° C.

The wear-resistant layer 30 may have any suitable thickness, measured from the surface of the thermal barrier layer 28, such as greater than or equal to about 1 millimeter to less than or equal to about 4 millimeters (e.g., less than or equal to about 3 millimeters). The wear-resistant layer 30 may be substantially coextensive with the thermal barrier layer 28 and the inner surface 27 of the drum core 26.

The wear-resistant layer 30 may be made of an iron alloy comprising, in addition to iron (Fe), alloying elements of aluminum (Al), silicon (Si), and zirconium (Zr), and thus may be referred to as an Fe—Al—Si—Zr alloy. The amount of aluminum, silicon, and zirconium in the iron alloy are selected to provide the Fe—Al—Si—Zr alloy with high strength, exceptional wear resistance, oxidation resistance, and corrosion resistance.

The Fe—Al—Si—Zr alloy may comprise, by mass, greater than or equal to about 45% to less than or equal to about 60% iron, greater than or equal to about 35% to less than or equal to about 45% aluminum, greater than or equal to about 1% to less than or equal to about 3% zirconium, and greater than or equal to about 0.5% to less than or equal to about 2% silicon. In an example embodiment, the Fe—Al—Si—Zr alloy may comprise, by mass, about 59% iron, about 36% aluminum, about 3% zirconium, and about 1% silicon. In the Fe—Al—Si—Zr alloy, the iron, aluminum, silicon, and zirconium may be present in the form of FeAlSiZr-containing intermetallic particles.

In some aspects, the Fe—Al—Si—Zr alloy may comprise a grain refiner. Examples of grain refiners include boride compounds, e.g., chromium(III) boride (CrB), tantalum boride (TaB and/or $TaB_2$), etc. In aspects where the grain refiner comprises chromium(III) boride and tantalum boride, the mass ratio of chromium(III) boride to tantalum boride in the Al—Fe—Si—Zr alloy may be about 1:1. The grain refiner may be present in the Fe—Al—Si—Zr alloy in an amount, by mass, greater than or equal to about 0.05% to less than or equal to about 1% of the Fe—Al—Si—Zr alloy.

The Fe—Al—Si—Zr alloy may exhibit a relatively high density, as compared to the density of the Al—Si alloy and/or the thermally insulating material. For example, the Fe—Al—Si—Zr alloy has a density of greater than or equal to about 4,800 kg/m³ to less than or equal to about 5,200 kg/m³. In one example, the Fe—Al—Si—Zr alloy may have a density of about 4,990 kg/m³. The Fe—Al—Si—Zr alloy may have a thermal conductivity of greater than or equal to about 11 W/m·K to less than or equal to about 13 W/m·K, and a specific heat of greater than or equal to about 0.61 KJ/kg·K to less than or equal to about 0.67 KJ/kg·K.

Additional elements not intentionally introduced into the composition of the presently disclosed Al—Si alloy and/or the Fe—Al—Si—Zr alloy nonetheless may be inherently present in the alloys in relatively small amounts, for example, in individual and/or cumulative amounts, by mass, less than or equal to about 1%, less than or equal to about 0.1%, less than or equal to about 0.05%, less than or equal to about 0.01% of the alloys, etc. Such elements may be present, for example, as impurities in the raw or scrap materials used to prepare the alloys. In example embodiments where the alloys are referred to as comprising one or more alloying elements (e.g., Si) and aluminum or iron as balance, the term "as balance" does not exclude the presence of additional elements not intentionally introduced into the composition of the alloys but nonetheless inherently present in the alloys in relatively small amounts, e.g., as impurities.

Referring now to FIG. 2, in some aspects, the thermal barrier layer 28 may be perforated. As shown in FIG. 2, the thermal barrier layer 28 may include one or more through-holes 29 extending through the thermal barrier layer 28. In some aspects, the through-holes 29 may extend entirely through the thermal barrier layer 28 to the drum core 26. In such case, wear-resistant layer 30 may include a plurality of anchors that extend from an outer surface 31 of the thermal barrier layer 28 into the plurality of through-holes 29 in the thermal barrier layer 28 to the inner surface 27 of the drum core 26. In such case, the Fe—Al—Si—Zr alloy of the wear-resistant layer 30 may be metallurgically bonded to the Al—Si alloy of the drum core 26 via the plurality of anchors.

A method of manufacturing the brake drum assembly 10 may include one or more of the following steps. The Al—Si alloy may be cast into the shape of the drum core 26. Next, the thermally insulating material may be deposited directly on the inner surface 27 of the drum core 26 to form the thermal barrier layer 28.

In some aspects, the thermally insulating material may be selectively deposited on the inner surface 27 of the drum core 26 in a predefined pattern, for example, such that the resulting thermal barrier layer 28 is perforated and includes the plurality of through-holes 29. Next, the Fe—Al—Si—Zr alloy may be deposited on the inner surface 27 of the drum core 26 over the thermal barrier layer 28 to form the wear-resistant layer 30. In aspects where the thermal barrier layer 28 is perforated, the Fe—Al—Si—Zr alloy may flow into the plurality of through-holes 29 and form the plurality of anchors, which may metallurgically bond with the inner surface 27 of the drum core 26.

Figure 4:
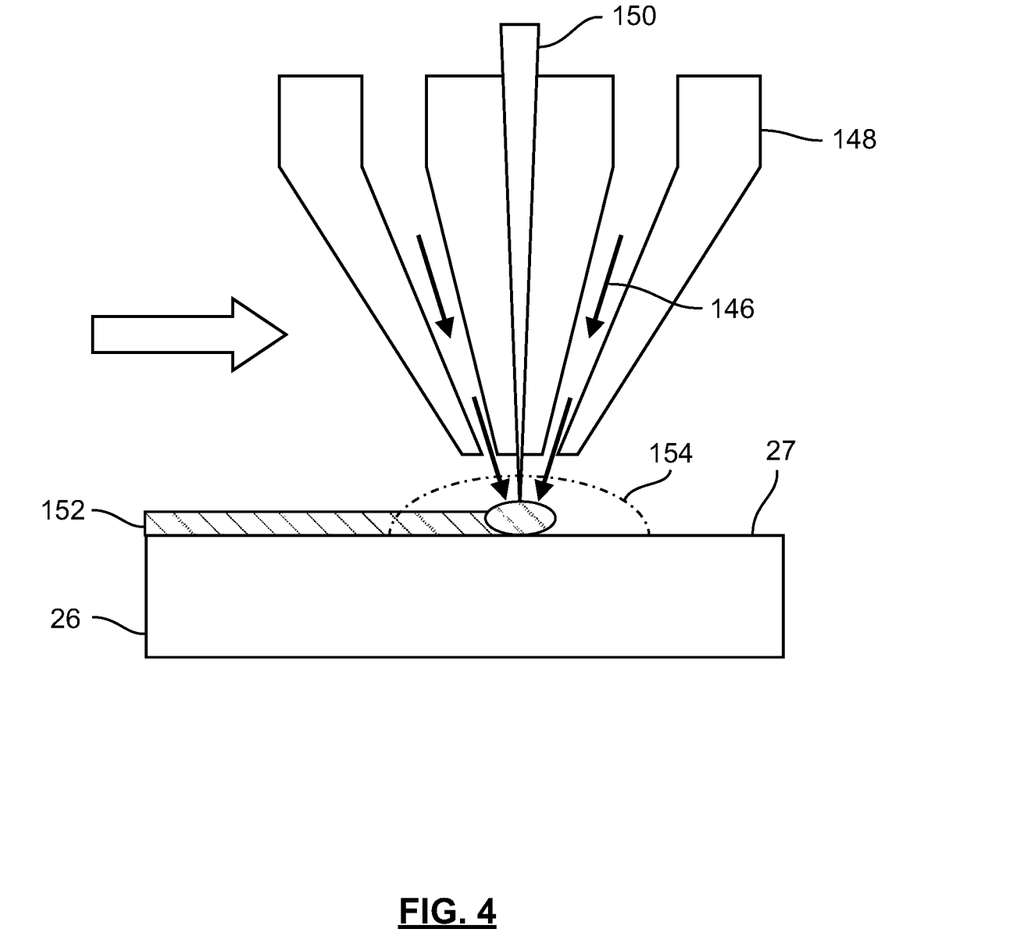
FIG. 4 is a cross-sectional view of an apparatus for depositing a thermal barrier layer and a wear-resistant layer on the drum core of the brake drum of FIG. 2.

Referring now to FIG. 4, in some aspects, the thermally insulating material and the Fe—Al—Si—Zr alloy may be respectively and sequentially deposited on the inner surface 27 of the drum core 26 using directed energy deposition (DED) processes. During the directed energy deposition processes, a feedstock material 146 is deposited by a nozzle 148 on the inner surface 27 of the drum core 26, and simultaneously melted by application of a focused energy source 150 thereto.

The nozzle 148 and focused energy source 150 are advanced along the inner surface 27 of the drum core 26 in a predefined pattern, leaving behind a layer of solidified feedstock material 152. The focused energy source may be a plasma arc, electron beam, or laser. A shielding gas may be applied to a zone 154 surrounding the deposition site to prevent or inhibit undesired side reactions.

The feedstock material 152 may be in the form of a wire or a powder and may exhibit substantially the same composition as the layer being formed. For example, during formation of the thermal barrier layer 28, the feedstock material 152 may have substantially the same composition as that of the thermally insulating material. Likewise, during formation of the wear-resistant layer 30, the feedstock material 152 may have substantially the same composition as that of the Fe—Al—Si—Zr alloy.

Figure 5:
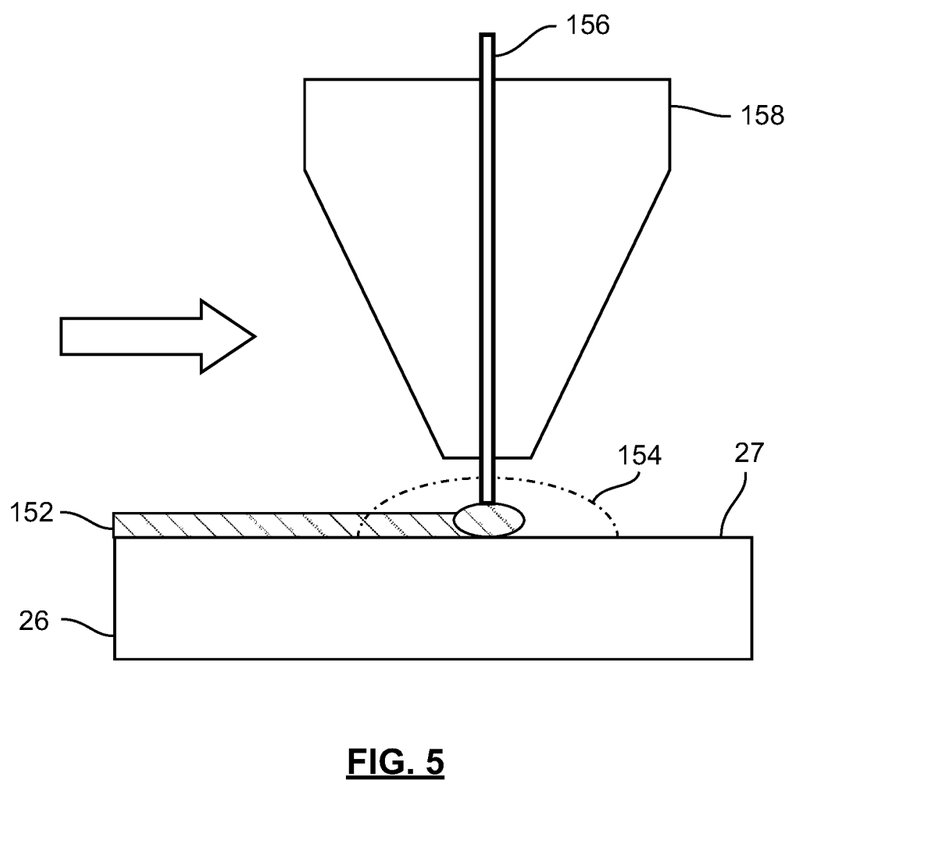
FIG. 5 is a cross-sectional view of an apparatus for depositing a thermal barrier layer and a wear-resistant layer on the drum core of FIG. 2 using a wire.

FIG. 5 illustrates an example embodiment of DED process where the feedstock material is an iron-based wire 156. As the nozzle 158 is advanced along the inner surface 27 of the drum core 26 in a predefined pattern, the iron-based wire 156 leaves behind a layer of solidified feedstock material 152. A shielding gas may be applied to a zone 154 surrounding the deposition site of the iron-based wire 156, to prevent or inhibit undesired side reactions.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A brake drum having a composite structure, the brake drum comprising:
    a cylindrical body defining an inner friction surface and an outer surface, the cylindrical body comprising:
        a drum core comprising an Al—Si alloy, the drum core including an inner surface, and an outer surface of the drum core defining the outer surface of cylindrical body;
        a thermal barrier layer comprising a thermally insulating material on the inner surface of the drum core; and
        a wear-resistant layer comprising an Fe—Al—Si—Zr alloy on the inner surface of the drum core over the thermal barrier layer, the wear-resistant layer defining the inner friction surface of the cylindrical body.

2. The brake drum of claim 1, wherein the wear-resistant layer is configured to engage one or more brake linings or brake shoes of a vehicle to slow rotation of the cylindrical body during braking of the vehicle.

3. The brake drum of claim 2, wherein the cylindrical body is configured to couple with an axle of the vehicle to slow rotation of one or more wheels connected to the axle in response to the one or more brake linings or brake shoes engaging the wear-resistant layer.

4. The brake drum of claim 1, wherein the Fe—Al—Si—Zr alloy comprises, by mass, greater than or equal to 45% to less than or equal to 60% iron, greater than or equal to 35% to less than or equal to 45% aluminum, greater than or equal to 1% to less than or equal to 3% zirconium, and greater than or equal to 0.5% to less than or equal to 2% silicon.

5. The brake drum of claim 4, wherein:
    the Fe—Al—Si—Zr alloy comprises, by mass, comprises a grain refiner in an amount, by mass, greater than or equal to 0.05% to less than or equal to 1% of the Fe—Al—Si—Zr alloy; and
    the grain refiner comprises at least one of chromium(III) boride and tantalum boride.

6. The brake drum of claim 4, wherein:
    the Fe—Al—Si—Zr alloy has a density of greater than or equal to 4,800 kilograms per cubic meter to less than or equal to 5,200 kilograms per cubic meter;
    the Fe—Al—Si—Zr alloy has a specific heat capacity of greater than or equal to 0.61 kilojoules per kilogram-kelvin to less than or equal to 0.67 kilojoules per kilogram-kelvin; and
    the Fe—Al—Si—Zr alloy has a thermal conductivity of greater than or equal to about 11 watts per meter-kelvin to less than or equal to 13 watts per meter-kelvin.

7. The brake drum of claim 1, wherein the thermally insulating material comprises a high entropy alloy, a high entropy ceramic, or a combination thereof.

8. The brake drum of claim 7, wherein:
    the thermally insulating material has a thermal conductivity of greater than or equal to 0.4 watts per meter-kelvin to less than or equal to 0.7 watts per meter-kelvin;
    the thermally insulating material has a specific heat capacity of greater than or equal to 1.3 kilojoules per kilogram-kelvin to less than or equal to 1.7 kilojoules per kilogram-kelvin; and
    the thermally insulating material has a density of greater than or equal to 1,300 kilograms per cubic meter to less than or equal to 1,700 kilograms per cubic meter.

9. The brake drum of claim 7, wherein the thermal barrier layer is perforated and includes a plurality of through-holes extending from the inner surface of the drum core to the wear-resistant layer.

10. The brake drum of claim 9, wherein the Fe—Al—Si—Zr alloy of the wear-resistant layer is metallurgically bonded to the Al—Si alloy of the drum core via the plurality of through-holes of the thermal barrier layer.

11. The brake drum of claim 1, wherein the Al—Si alloy comprises, by mass, greater than or equal to 7% to less than or equal to 20% silicon, greater than or equal to 0.4% to less than or equal to 0.9% magnesium, and greater than or equal to 79.1% to less than or equal to 92.6% aluminum.

12. The brake drum of claim 11, wherein the Al—Si alloy comprises 359.0 cast aluminum.

13. The brake drum of claim 11, wherein:
the Al—Si alloy has a density of greater than or equal to 2,500 kilograms per cubic meter to less than or equal to 2,900 kilograms per cubic meter;
the Al—Si alloy has a specific heat capacity of greater than or equal to 0.9 kilojoules per kilogram-kelvin to less than or equal to 1.3 kilojoules per kilogram-kelvin; and
the Al—Si alloy has a thermal conductivity of greater than or equal to about 186 watts per meter-kelvin to less than or equal to 225 watts per meter-kelvin.

14. A method of manufacturing a brake drum, the method comprising:
casting an Al—Si alloy into a shape of a brake drum core, the brake drum core defining a cylindrical body including an inner surface and an outer surface;
depositing a thermally insulating material directly on the inner surface of the brake drum core to form a thermal barrier layer; and
depositing an Fe—Al—Si—Zr alloy on the inner surface of the brake drum core over the thermal barrier layer to form a wear-resistant layer, the wear-resistant layer including an inner friction surface configured to engage one or more brake linings or shoes of a vehicle to slow rotation of the brake drum during braking of the vehicle.

15. The method of claim 14, wherein the thermally insulating material and the Fe—Al—Si—Zr alloy are deposited on the inner surface of the brake drum core using a directed energy deposition process.

16. The method of claim 15, wherein the thermally insulating material is deposited on the inner surface of the brake drum core such that the thermal barrier layer is perforated and includes a plurality of through-holes extending from the inner surface of the brake drum core to the wear-resistant layer.

17. The method of claim 16, wherein, during deposition of the Fe—Al—Si—Zr alloy on the inner surface of the brake drum core, the Fe—Al—Si—Zr alloy flows into and through the through-holes in the thermal barrier layer to metallurgically bond the Fe—Al—Si—Zr alloy of the wear-resistant layer to the Al—Si alloy of the brake drum core.

18. A brake drum having a composite structure, the brake drum comprising:
a cylindrical body defining an inner friction surface and an outer surface, the cylindrical body comprising:
a drum core comprising an aluminum (Al) alloy, the drum core including an inner surface, and an outer surface of the drum core defining the outer surface of cylindrical body;
a thermal barrier layer comprising a thermally insulating material on the inner surface of the drum core; and
a wear-resistant layer comprising an Iron-Aluminum-Silicon-Zirconium (Fe—Al—Si—Zr) alloy on the inner surface of the drum core over the thermal barrier layer, the wear-resistant layer defining the inner friction surface of the cylindrical body.

19. The brake drum of claim 18, wherein the thermally insulating material comprises a high entropy alloy, a high entropy ceramic, or a combination thereof.

20. The brake drum of claim 18, wherein the thermal barrier layer is perforated and includes a plurality of through-holes extending from the inner surface of the drum core to the wear-resistant layer.

* * * * *